Jan. 25, 1944. H. P. NORFORD 2,340,139
INDICATING CLIMBING DEVICE
Filed May 10, 1943
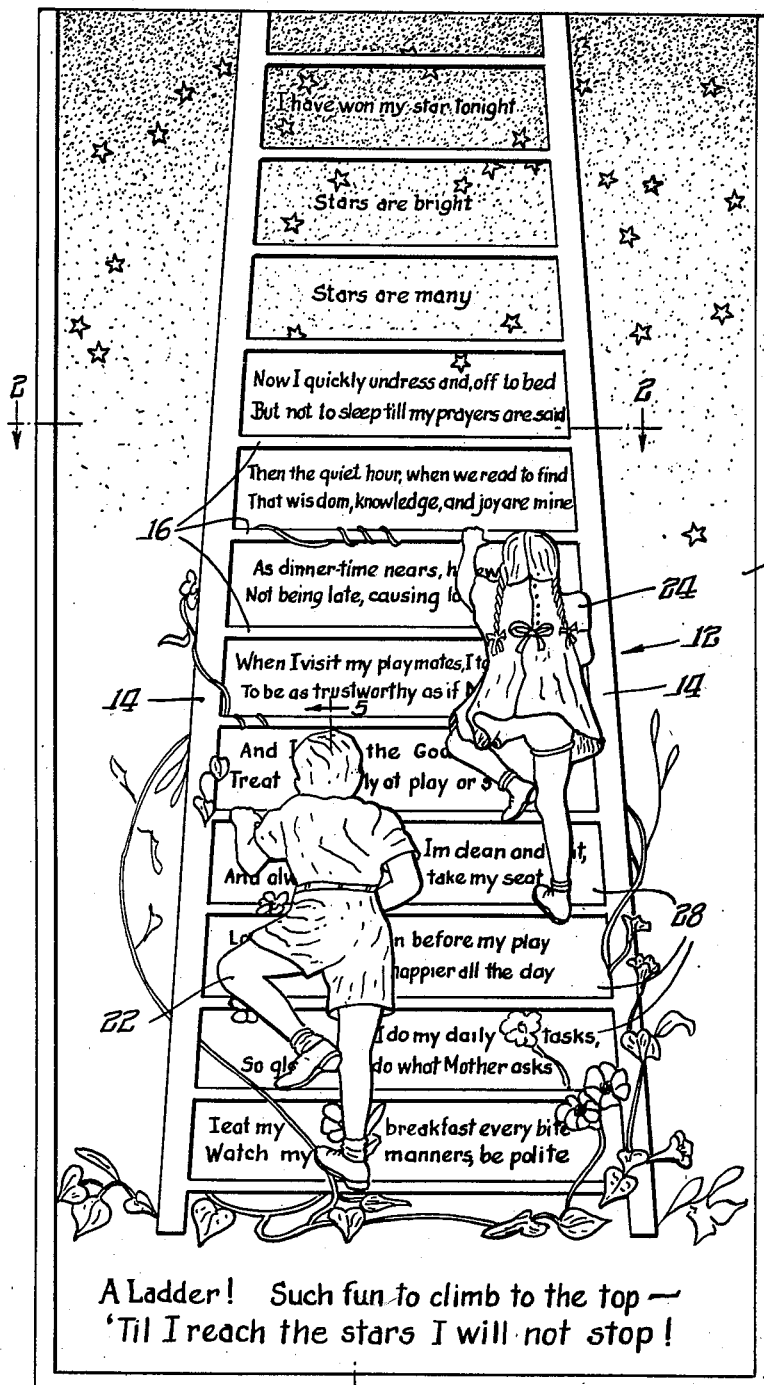
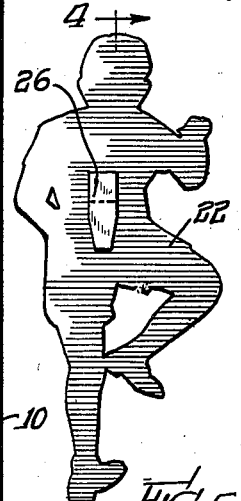
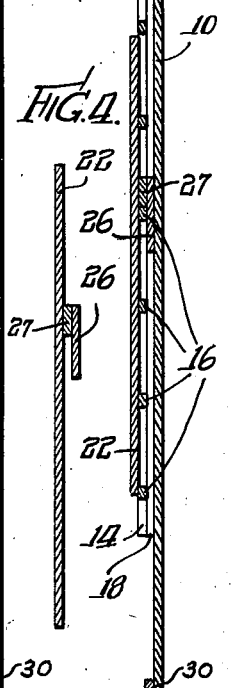
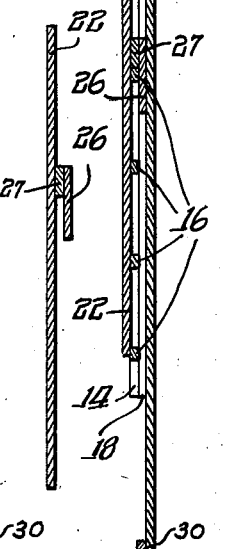

Patented Jan. 25, 1944

2,340,139

UNITED STATES PATENT OFFICE 2,340,139

INDICATING CLIMBING DEVICE

Helen P. Norford, Chicago, Ill.

Application May 10, 1943, Serial No. 486,396

9 Claims. (Cl. 35—23)

This invention relates generally to devices for indicating a progression of activites and more particularly to a device in which an element simulating a creature capable of climbing is arranged to progressively climb from one indicating station to another.

With the thought in mind that it is an inherent characteristic of the human race to aspire to greater heights or in other words to climb toward a given goal, the present invention proposes to provide a simple yet novel device whereby a progression of activities or achievements may be made visually apparent.

More specifically, the invention contemplates a device of the type referred to above wherein climbing progressively from one station of activity or achievement to another may be visually emphasized by employing an element simulating a climbing creature, as for example, a human being, in shiftable association with a replica of an object which would normally be climbed.

Still more specifically, the invention contemplates the provision of a device in which the element simulating a climbing creature such as a human being is so arranged as to climb progressively on steps or rungs from one station of activity or accomplishment to another.

It is a further object of the present invention to not only visually emphasize the climbing progress of one individual but also to make visually apparent the comparative climbing progress of a plurality of individuals.

A still more specific object is to provide a device wherein a replica of a ladder and a figure representing a climbing creature shiftable upon the ladder in a climbing direction are employed to designate climbing progress in respectively different activities or achievements from one station to another.

The foregoing and other objects and advantages will be more apparent from the following detailed description when considered in connection with the accompanying drawing, wherein—

Fig. 1 is an elevational view of a device which is representative of one embodiment of the invention;

Fig. 2 is a horizontal sectional view of the device taken substantially along the line 2—2 of Fig. 1;

Fig. 3 is a rear view of the element representing the boy of Fig. 1;

Fig. 4 is a vertical sectional view taken substantially along the line 4—4 of Fig. 3; and Fig. 5 is a fragmentary vertical sectional view taken substantially along the line 5—5 of Fig. 1.

Referring now to the drawing more in detail wherein like numerals have been employed to designate similar parts throughout the various figures, it will be seen that one embodiment of the invention includes a mounting board or plaque 10. This mounting board 10 bears a replica of an object such as a ladder designated generally by the numeral 12 which an individual would normally climb. In the disclosed embodiment the ladder 12 is made from a single sheet of stock and includes side pieces or strips 14 and rungs 16. In order to space the rungs 16 from the forward surface of the plaque 10, spacing strips 18 are interposed between the ladder side pieces 14 and the plaque. This arrangement provides a space 20 between the plaque and the rungs 16.

Attention is now directed to the figure or cutout element 22 representing a boy and the figure 24 representing a girl. It will be noted that the posture of these figures 22 and 24 is such that when they are properly associated with the rungs 16, as illustrated in Fig. 1, the position of their feet and hands has a predetermined relation to the rungs so as to indicate climbing. On the side of the figures 22 and 24 facing the ladder rungs, coupling means in the form of a coupling element or clip 26 is provided. This clip 26 is spaced from the figures 22 and 24 by a spacer 27 formed from a single thickness of stock as are rungs 16. By reason of the spacing of clip 26, it may be slipped over and under any of the rungs 16 of the ladder in position engaging the rear face of the rungs, as clearly illustrated in Fig. 5. By this simple coupling arrangement, the figures 22 and 24 may be held in proper association with the ladder rungs and may be independently shifted from one rung to another. That is to say, the figures 22 and 24 are detachably associated with the ladder 12 and capable of independent shifting from one rung to another.

In association with the rungs 16 I provide appropriately designated stations having areas or spaces bearing indicia 28 for indicating a progression of accomplishments or activities. In the embodiment disclosed herein, for purposes of illustration and not by way of limitation, these spaces or stations 28 are employed to designate the activities or accomplishments of a child beginning at the lower station with the morning activities and progressing upwardly to the end of the day. These stations or activities are indicated as follows:

I have won my star tonight

Stars are bright

Stars are many

Now I quickly undress and off to bed
But not to sleep till my prayers are said

Then the quiet hour, when we read to find
That wisdom, knowledge, and joy are mine As dinner-time nears, homeward I hurry
Not being late, causing loved ones to worry When I visit my playmates, I take care
To be as trustworthy as if mother were there And I observe the Golden Rule
Treat others fairly at play or school When lunch is served I am clean and neat
And always ready to take my seat Learn a Bible truth before my play
To make me happier all the day With a smile I do my daily tasks
So glad to do what mother asks I eat my breakfast every bite
Watch my manners, be polite In the disclosed embodiment the lower portion of the ladder has in association therewith morning glories which are indicative of the time of day and in the vicinity of the upper termination of the ladder the dark sky and stars convey the thought of nightfall. The appearance of the specific structure disclosed is further enhanced by the border 30 which is formed of a single thickness of stock and extends along the bottom and up both sides of the plaque 10.

Obviously the invention is not in any sense limited to the specific thoughts conveyed at the stations in the disclosed embodiment nor is the invention confined to any particular artistic arrangements used in association with the ladder. The invention does contemplate a device which is capable of indicating a progression of activities such, for example, as the activities of a child or other individual. It also contemplates the provision of means such as the plaque 10 bearing a replica of an object which would normally be climbed. For purposes of illustration in the present instance an object in the form of a ladder is shown.

The invention further contemplates employing an element for climbing the aforesaid object and this element simulates a creature capable of climbing such as a human being. By having a plurality of stations associated with the object providing spaces for indicating a progression of activities, the movement of the figure in a climbing direction from one station to another serves to make visually apparent in a most interesting and instructive manner the progress in these activities or accomplishments. By having a series of steps arranged in vertically spaced relation in association with figures particularly adapted to move along those steps in a climbing direction, progress or achievement is most clearly indicated.

Particular attention is directed to the fact that in the disclosed embodiment of the invention, the arrangement of the steps or rungs is such as to permit the use of more than one climbing figure. By this construction comparisons in the success of achieving a given goal may be emphasized. That is to say, the comparative attainments in climbing from one station of activity or accomplishment to another may be made visually apparent at all times.

Climbing is a sport to which children instinctively and enthusiastically take. Therefore, the thought of climbing to greater heights and toward a given goal from one station of activity or achievement to another has a particular appeal to children. The present invention, therefore, appeals to a child as a game in which the child figuratively climbs through a progression of activities from morning until night. A contest between two or more children in carrying out this game of climbing also serves to stimulate the eagerness to succeed.

The device as described herein may be made in various sizes and shapes, depending upon its intended use. A wide variety of activities or accomplishments may be used in associating with climbing figures and an equally wide variety of artistic arrangements particularly suited to individual requirements may be employed. The device serves as a morale building instrumentality and provides the added incentive sometimes needed to insure the maximum in achievement.

From the foregoing it will be apparent that the invention is not limited to the particular embodiment disclosed herein but is capable of other changes and modifications without departing from the spirit and scope of the appended claims.

The invention is hereby claimed as follows:

1. In a device for indicating a succession of activities, means bearing a replica of an object which a living creature would climb, at least one element simulating a living creature which would climb said object, a plurality of appropriately designated stations associated with said replica providing spaces having indicia for indicating a succession of activities, means associated with said element, and means associated with said replica adapted to cooperate with said last named means for shiftably holding said element in any of a plurality of predetermined positions spaced apart in a climbing direction on said replica whereby said element may be selectively maintained in a predetermined position of association with said replica and moved to a new position of association therewith.

2. In a device for indicating a succession of activities, means bearing a replica of an object having a series of steps to be climbed, at least one element simulating a child in a climbing posture, a plurality of appropriately designated stations associated with the steps of said replica providing spaces each bearing indicia for indicating respectively a succession of different activities, means associated with said element, and means associated with said replica adapted to cooperate with said last named means for shiftably holding said element in a predetermined position with respect to each station, in which predetermined position said element appears to be climbing said replica.

3. In a device for indicating a succession of activities, means bearing a replica of an object having a series of steps to be climbed, at least one element simulating a living creature which would climb said object, a plurality of appropriately designated stations associated with said replica providing spaces bearing indicia for indicating a succession of respectively different activities, means associated with said element, and means associated with said replica adapted to cooperate with said last named means for shiftably holding said element in any of a plurality of predetermined positions spaced apart in a climbing direction on said replica whereby said element may be selectively maintained in a predetermined position of association with said replica and moved to a new position of association therewith.

4. In a device for indicating a succession of activities, means bearing a replica of an object which a living creature would climb, at least two elements each simulating a living creature which would climb said object, a plurality of appropriately designated stations associated with said replica providing spaces for indicating a succession of respectively different activities, means associated with each of said elements, and means associated with said replica adapted to cooperate with said last named means for shiftably holding said elements independently in any of a plurality of predetermined positions spaced apart in a climbing direction on said replica whereby said elements may be selectively and independently maintained in predetermined positions of association with said replica and independently moved to new positions of association therewith in simulation of one creature racing with the other.

5. In a device for indicating a succession of activities, means bearing a replica of a ladder, at least one element simulating a living creature which would climb said ladder, a plurality of appropriately designated stations associated with said replica providing spaces for indicating a succession of respectively different activities, means associated with said element, and means associated with said replica adapted to cooperate with said last named means for shiftably holding said element in any of a plurality of predetermined positions spaced apart in a climbing direction on said replica whereby said element may be selectively maintained in a predetermined position of association with said replica and moved to a new position of association therewith.

6. In a device for indicating a succession of activities, means bearing a replica of an object which a human being would climb, at least one element simulating a human being in a climbing posture, a plurality of appropriately designated stations associated with said replica providing spaces for indicating a succession of respectively different activities, means associated with said element, and means associated with said replica adapted to cooperate with said last named means for shiftably holding said element in any of a plurality of predetermined positions spaced apart in a climbing direction on said replica whereby said element may be selectively maintained in a predetermined position of association with said replica and moved to a new position of association therewth.

7. In a device for indicating a succession of activities, means bearing a replica of an object having a series of steps to be climbed, at least one element simulating a human being in a climbing posture, a plurality of appropriately designated stations associated with said replica providing spaces for indicating a succession of respectively different activities, means associated with said element, and means associated with said replica adapted to cooperate with said last named means for shiftably holding said element in any of a plurality of predetermined positions spaced apart in a climbing direction on said replica whereby said element may be selectively maintained in a predetermined position of association with said replica and moved to a new position of association therewith.

8. In a device for indicating a succession of activities, means bearing a replica of an object which a living creature would climb, at least one element simulating a living creature which would climb said object, said living creature being in a climbing posture in said element, a plurality of appropriately designated stations associated with said replica providing spaces for indicating a succession of respectively different activities, means associated with said element, and means associated with said replica adapted to cooperate with said last named means for shiftably holding said element in any of a plurality of predetermined positions spaced apart in a climbing direction on said replica whereby said element may be selectively maintained in a predetermined position of association with said replica and moved to a new position of association therewith.

9. In a device for indicating a succesion of activities, a base portion, a ladder structure associated with said base portion, the rungs of said ladder being spaced from said base portion, an element simulating a living creature which would climb the rungs of said ladder, a plurality of appropriately designated stations provided in the vicinity of the rungs of said ladder for indicating a succession of respectively different activities, coupling means associated with said element and adapted to cooperate with a portion of the rungs spaced from the base portion for shiftably holding said element in any of a plurality of predetermined positions spaced apart in a climbing direction on said ladder whereby said element may be selectively maintained in a predetermined position of association with the rungs of said ladder and moved to a new position of association with said rungs.

HELEN P. NORFORD.